United States Patent
Mori et al.

(10) Patent No.: US 7,115,672 B2
(45) Date of Patent: Oct. 3, 2006

(54) PRODUCTION METHOD OF POROUS RESIN

(75) Inventors: Kenjiro Mori, Ibaraki (JP); Tatsuya Konishi, Ibaraki (JP)

(73) Assignee: Nitto Denko Corporation, Ibaraki (JP)

( * ) Notice: Subject to any disclaimer, the term of this patent is extended or adjusted under 35 U.S.C. 154(b) by 0 days.

(21) Appl. No.: 11/128,617

(22) Filed: May 13, 2005

(65) Prior Publication Data

US 2005/0256285 A1 Nov. 17, 2005

(30) Foreign Application Priority Data

May 14, 2004 (JP) ............................. 2004-145596

(51) Int. Cl.
*C08F 8/12* (2006.01)
*C08F 236/20* (2006.01)

(52) U.S. Cl. .................. 521/147; 525/329.5; 526/206; 526/224; 526/326

(58) Field of Classification Search ................ 521/147; 525/329.5; 526/326, 206, 224
See application file for complete search history.

(56) References Cited

U.S. PATENT DOCUMENTS

| | | | |
|---|---|---|---|
| 3,726,848 A | * | 4/1973 | Squire et al. ................ 526/73 |
| 3,817,965 A | * | 6/1974 | Mace et al. ................... 526/73 |
| 4,962,147 A | * | 10/1990 | Vicari ........................ 524/460 |
| 5,118,718 A | | 6/1992 | Walter et al. |
| 2005/0054742 A1 | | 3/2005 | Mori et al. |

FOREIGN PATENT DOCUMENTS

| | | |
|---|---|---|
| EP | 0 277 721 A2 | 8/1988 |
| EP | 0 488 019 A2 | 6/1992 |
| EP | 1 510 541 A1 | 3/2005 |
| FR | 2 725 994 A1 | 4/1996 |
| JP | 58-210914 A | 12/1983 |

OTHER PUBLICATIONS

Deleuze et al, "Poly(p-acetoxystyrene) resin: a prospective new support for combinatorial synthesis", J. Chem. Perkin Trans. 2, 1995, 2217-2221.*

Arshady et al, "Suspension Polymerization and Its Application to the Preparation of Polymer Supports", Reactive Polymers, 1 (1983) 159-174.*

* cited by examiner

*Primary Examiner*—Fred Teskin
(74) *Attorney, Agent, or Firm*—Leydig, Voit & Mayer, Ltd.

(57) ABSTRACT

A production method of a porous resin or an intermediate therefor, which comprises a step of producing a styrene-acyloxystyrene-divinylbenzene copolymer comprising suspension copolymerization of a styrene monomer, an acyloxystyrene monomer and a divinylbenzene monomer using an organic solvent and water, and a step of converting the styrene-acyloxystyrene-divinylbenzene copolymer to a styrene-hydroxystyrene-divinylbenzene copolymer, wherein a chain transfer agent is added to the suspension copolymerization system.

9 Claims, 1 Drawing Sheet

PRODUCTION METHOD OF POROUS RESIN

TECHNICAL FIELD OF THE INVENTION

The present invention relates to a production method of a styrene-hydroxystyrene-divinylbenzene copolymer. More specifically, the present invention relates to a production method of a porous resin comprising the styrene-hydroxystyrene-divinylbenzene copolymer.

BACKGROUND OF THE INVENTION

Conventionally, as polystyrene porous resins, hydroxystyrene-polyene copolymers (JP-A-52-23193 and JP-A-58-210914) and copolymer resins obtained by copolymerization of alkoxystyrenes, aromatic polyvinyls and aromatic vinyl compounds (JP-A-5-86132) are known. Beads made of these porous resins have been mainly applied to ion exchange resins, absorbents and the like. In these uses, adsorption of the largest possible amount of a substance is considered to be right, and therefore, conventional development guidelines of porous resin beads include attaching as much amount as possible of functional groups and increasing the specific surface area to the highest possible amount, thus aiming toward enhanced ability to adsorb a substance per unit volume of porous resin beads. Moreover, these porous resin beads are used as reaction fields to efficiently carrying out chemical reactions. In this case, to increase the amount of a substance synthesized by chemical reaction, it is preferable to make the porous resin beads swell in an organic solvent to a certain degree. However, when plural organic solvents are exchanged to perform chemical reactions, different degrees of swelling of the porous resin beads in each organic solvent give rise to a problem of, for example, changes in the pressure of the inside of columnar reaction containers having given volumes and the like. Therefore, the development of a porous resin showing smaller changes in the degree of swelling due to the kind of organic solvents has been desired.

SUMMARY OF THE INVENTION

In view of the above-mentioned situation, the present invention aims at provision of a method capable of producing a porous resin showing smaller changes in the degree of swelling due to the kind of organic solvents.

The present inventors have found that the above-mentioned problems can be solved by, in a production method of a porous resin comprising a step of producing a styrene-acyloxystyrene-divinylbenzene copolymer comprising suspension copolymerization of a styrene monomer, an acyloxystyrene monomer and a divinylbenzene monomer using an organic solvent and water, and a step of converting the styrene-acyloxystyrene-divinylbenzene copolymer to a styrene-hydroxystyrene-divinylbenzene copolymer, adding a chain transfer agent to the suspension copolymerization system.

Accordingly, the present invention provides the following.

(1) A production method of a porous resin, which comprises a step of producing a styrene-acyloxystyrene-divinylbenzene copolymer comprising suspension copolymerization of a styrene monomer, an acyloxystyrene monomer and a divinylbenzene monomer using an organic solvent and water, and a step of converting the styrene-acyloxystyrene-divinylbenzene copolymer to a styrene-hydroxystyrene-divinylbenzene copolymer, wherein a chain transfer agent is added to the suspension copolymerization system.

(2) The method of (1), wherein, in the suspension copolymerization, the proportion of the amount of the acyloxystyrene monomer in the total amount of monomer is 02–20 wt %, and the proportion of the amount of the divinylbenzene monomer in the total amount of the monomer is 2–30 wt %.

(3) The method of (1) or (2), wherein the weight of the organic solvent in the suspension copolymerization is 0.5–2.0 times the total weight of the monomer.

(4) The method of any of (1)–(3), wherein the amount of the chain transfer agent in the suspension copolymerization is 0.01–5 wt % of the total amount of the monomer.

(5) The method of any of (1)–(4), wherein the styrene monomer comprises styrene, the acyloxystyrene monomer comprises p-acetoxystyrene and the divinylbenzene monomer comprises divinylbenzene.

(6) The method of any of (1)–(5), wherein the porous resin is in the form of a bead.

(7) A production method of a styrene-acyloxystyrene-divinylbenzene copolymer, which comprises suspension copolymerization of a styrene monomer, an acyloxystyrene monomer and a divinylbenzene monomer using an organic solvent and water, wherein a chain transfer agent is added to the suspension copolymerization system.

(8) The method of (7), wherein, in the suspension copolymerization, the proportion of the amount of the acyloxystyrene monomer in the total amount of monomer is 0.2–20 wt %, and the proportion of the amount of the divinylbenzene monomer in the total amount of the monomer is 2–30 wt %.

(9) The method of (7) or (8), wherein the weight of the organic solvent in the suspension copolymerization is 0.5–2.0 times the total weight of the monomer.

(10) The method of any of (7)–(9), wherein the amount of the chain transfer agent in the suspension copolymerization is 0.01–5 wt % of the total amount of the monomer.

(11) The method of any of (7)–(10), wherein the styrene monomer comprises styrene, the acyloxystyrene monomer comprises p-acetoxystyrene and the divinylbenzene monomer comprises divinylbenzene.

According to the present invention, a porous resin showing smaller changes in the degree of swelling due to the kind of organic solvents and capable of providing a reaction field where chemical reactions can be efficiently carried out can be obtained.

DETAILED DESCRIPTION OF THE INVENTION

Figure 1A:
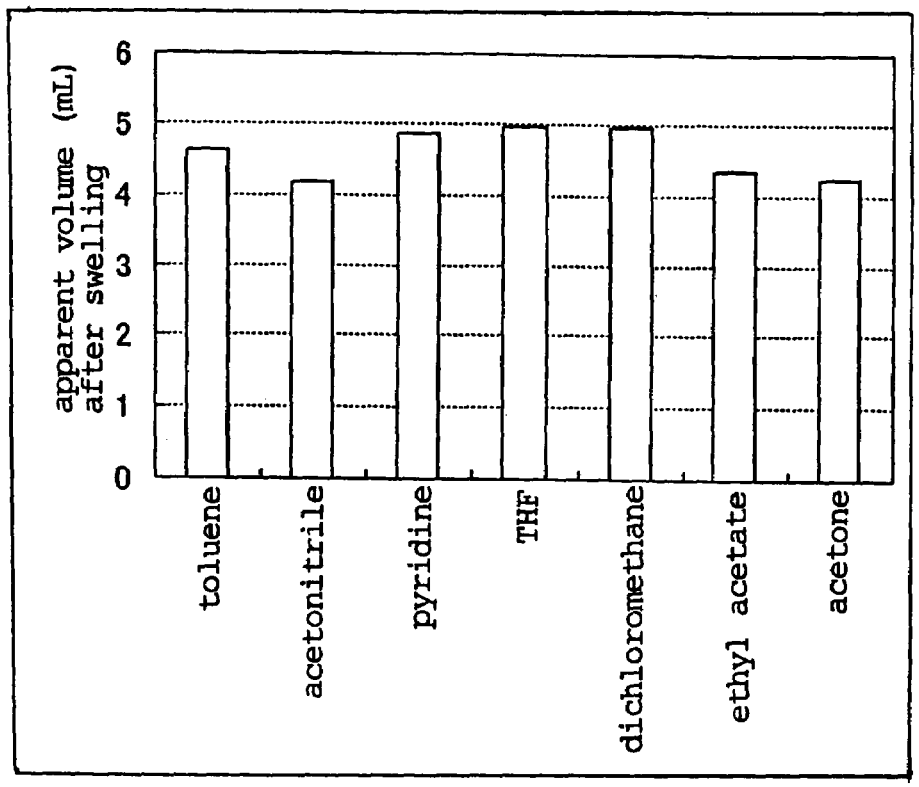
FIG. 1A is a graph showing the apparent volume (mL) of the porous resin beads of Example in various organic solvents (toluene, acetonitrile, pyridine, tetrahydrofuran (THF), dichloromethane, ethyl acetate, acetone).

In the present invention, the styrene monomer means styrene or a substituted form thereof, with preference given to unsubstituted styrene. As the substituted form of styrene, a compound wherein one or more hydrogen atoms of styrene are substituted by alkyl group having 1 to 5 carbon atoms, halogen atom, amino group, carboxyl group, sulfonic acid group, cyano group, methoxy group, nitro group and the like can be mentioned.

The acyloxystyrene monomer means acyloxystyrene (wherein acyloxy group is substituted in the phenyl group moiety of styrene) or a substituted form thereof, with preference given to unsubstituted p-acetoxystyrene. As the substituted form of acyloxystyrene, a compound wherein one or more hydrogen atoms other than acyloxy group are substituted by alkyl group having 1 to 5 carbon atoms, halogen atom, amino group, carboxyl group, sulfonic acid group, cyano group, methoxy group, nitro group and the like can be mentioned. The acyloxy group means a group represented by the formula X—CO—O— wherein X is alkyl group, with preference given to acyloxy group wherein the alkyl group moiety shown by X has 1 to 5 carbon atoms, and acetoxy group is more preferable. While the acyloxy group is preferably present at the para position to the vinyl group of styrene, it may be present at the ortho position or meta position.

The divinylbenzene monomer means divinylbenzene or a substituted form thereof, with preference given to unsubstituted divinylbenzene. As the substituted form of divinylbenzene, a compound wherein one or more hydrogen atoms of divinylbenzene are substituted by alkyl group having 1 to 5 carbon atoms, halogen atom, amino group, carboxyl group, sulfonic acid group, cyano group, methoxy group, nitro group and the like can be mentioned. Two vinyl groups may be present at any of the para position, meta position and ortho position.

When applied to suspension copolymerization, the amount of the acyloxystyrene monomer in the total amount of the styrene monomer, the acyloxystyrene monomer and the divinylbenzene monomer is preferably not less than 0.2 wt %, more preferably not less than 2 wt %, and preferably not more than 20 wt %, more preferably not more than 8 wt %. When the amount thereof is smaller than this range, the amount of hydroxyl group obtained finally becomes lower. Thus, the amount of the reaction product obtained by the reaction using the porous resin obtained by the production method of the present invention (hereinafter to be abbreviated as the porous resin of the present invention) as the reaction field decreases. When the amount thereof is larger than this amount, the distance between the adjacent hydroxyl groups becomes insufficient. As a result, the chemical reactions occurring in adjacency becomes inhibited, which in turn decreases the purity of the reaction product obtained by the reaction using the porous resin of the present invention as a reaction field.

When applied to suspension copolymerization, the amount of the divinylbenzene monomer in the total amount of the styrene monomer, acyloxystyrene monomer and divinylbenzene monomer is preferably not less than 2 wt %, more preferably not less than 5 wt %, and preferably not more than 30 wt %, more preferably not more than 20 wt %. When the amount is lower than this range, the specific surface area of the obtained porous resin becomes significantly smaller, which in turn decreases the amount of the reaction product obtained by the reaction using the porous resin of the present invention as a reaction field. When the amount is larger than this range, the degree of swelling of the obtained porous resin in an organic solvent becomes smaller, which in turn decreases the amount of the reaction product obtained by the reaction using the porous resin of the present invention as a reaction field.

In the present invention, the suspension copolymerization system may contain a monomer component that does not belong to any of the styrene monomer, the acyloxystyrene monomer and the divinylbenzene monomer. When unsubstituted divinylbenzene is used as a divinylbenzene monomer, a mixture with ethylstyrene and the like may be used. In this case, ethylstyrene in the mixture corresponds to the styrene monomer.

In the present invention, the organic solvent for the suspension copolymerization means a solvent other than water. As the organic solvent, hydrocarbon and alcohol is preferably used. As the hydrocarbon, aliphatic saturated or unsaturated hydrocarbon, or aromatic hydrocarbon can be used, with preference given to aliphatic hydrocarbon having 5 to 12 carbon atoms. Preferable hydrocarbon includes n-hexane, n-heptane, n-octane, isooctane, undecane, dodecane and the like. By the co-presence of alcohol during suspension copolymerization, the obtained porous resin has a greater porosity. As alcohol, for example, aliphatic alcohol can be mentioned, wherein the alkyl group preferably has 5 to 12 carbon atoms. Preferable alcohol includes 2-ethylhexanol, t-amylalcohol, nonylalcohol, 2-octanol, decanol, lauryl alcohol, cyclohexanol and the like. As the organic solvent, a mixture of hydrocarbon and alcohol is also used preferably. In this case, the weight ratio of hydrocarbon and alcohol varies depending on the specific combination of the hydrocarbon and alcohol, and the specific surface area of the obtained porous resin can be increased by appropriately adjusting this ratio.

The weight of the organic solvent for the suspension copolymerization is preferably not less than 0.5 time, more preferably not less than 0.8 time, and preferably not more than 2.0 times, more preferably not more than 1.5 times, the total weight of the monomer. The liquid organic substances relating to the reaction system, such as dispersion stabilizer, polymerization initiator and the like, is not included in the organic solvent. In any case of the weight of the organic solvent being greater or smaller, the obtained porous resin comes to have a smaller specific surface area, and the amount of the synthetic reaction product by the chemical reaction decreases.

In the preferable embodiment of the present invention, the porous resin obtained in the present invention is in the form of a bead, and the bead may have, for example, a specific surface area of 0.1–500 $m^2/g$ (by multipoint BET method), an average particle size of 1–1000 μm (by laser diffraction/scattering method) and an amount of hydroxyl group of 10–1000 μmol/g (by titration based on JIS K0070).

In the present invention, a chain transfer agent is added to the system of suspension copolymerization. As the chain transfer agent, for example, mercaptans such as methylmercaptan, butylmercaptan, n-octylmercaptan, n-dodecylmercaptan, t-dodecylmercaptan and the like, thioglycolic acid, thioglycolates such as 2-ethylhexyl thioglycolate, isooctyl thioglycolate and the like, halogenated carbons such as carbon tetrabromide, carbon tetrachloride and the like, aluminum compounds such as triethyl aluminum and the like, nitro compounds such as trinitrobenzene and the like, α-methylstyrene dimer and the like can be used. Of these, a chain transfer agent capable of showing effects even in a small amount is preferable so as to avoid influence on the specific surface area and pore size of the porous resin, and n-octylmercaptan, n-dodecylmercaptan, carbon tetrabromide and α-methylstyrene dimer are preferably used. The amount of the chain transfer agent to be added is preferably not less than 0.01 wt %, more preferably not less than 0.05 wt %, and preferably not more than 5 wt %, more preferably not more than 2 wt %, of the total weight of the monomer. When the amount is smaller than this range, the effect of the present invention cannot be afforded and when it is greater than this range, the polymerization rate decreases to prove disadvantageous for the production.

In the present invention, the method of suspension copolymerization may be other than the method concretely described in the present specification and may be one conventionally known in this field.

For suspension copolymerization, a dispersion stabilizer is used as appropriate. The dispersion stabilizer is not particularly limited, and those conventionally known such as hydrophilic protective colloids (e.g., polyvinyl alcohol, polyacrylic acid, gelatin, starch, carboxylmethyl cellulose and the like), hardly soluble powders (e.g., calcium carbonate, magnesium carbonate, calcium phosphate, barium sulfate, calcium sulfate, bentonite and the like), and the like can be used. While the amount of the dispersion stabilizer to be added is not particularly limited, it is preferably 0.01–10 wt % of the weight of water in the suspension polymerization system. When the amount is smaller than this range, the dispersion stability of the suspension polymerization is impaired and a large amount of agglomerates is produced, and when the amount is greater than this range, a number of fine particles are produced.

For suspension copolymerization, a polymerization initiator can be used as appropriate. The polymerization initiator is not particularly limited, and those conventionally known such as peroxides (e.g., dibenzoylperoxide, dilauroylperoxide, distearoylperoxide, 1,1-di(t-butylperoxy)-2-methylcyclohexane, 1,1-di(t-hexylperoxy)-3,3,5-trimethylcyclohexane, 1,1-di(t-hexylperoxy)cyclohexane, 1,1-di(t-butylperoxy)cyclohexane, di-t-hexylperoxide, t-butylcumylperoxide, di-t-butylperoxide, 1,1,3,3-tetramethylbutylperoxy-2-ethylhexanoate, t-hexylperoxy-2-ethylhexanoate, t-butylperoxy-2-ethylhexanoate, t-butylperoxyisopropylmonocarbonate and the like), azo compounds (e.g., 2,2'-azobisisobutyronitrile, 2,2'-azobis-2-methylbutyronitrile, 2,2'-azobis-2,4-dimethylvaleronitrile and the like), and the like can be used.

While the reaction conditions of the suspension copolymerization such as temperature, reaction time and the like can be appropriately determined, an example of the reaction conditions includes stirring under a nitrogen stream at 60–90° C. for 30 min–48 hr.

A styrene-acyloxystyrene-divinylbenzene copolymer can be obtained by suspension copolymerization of a styrene monomer, an acyloxystyrene monomer and a divinylbenzene monomer as mentioned above. After washing, classification and the like of the obtained copolymer as appropriate, a hydrolysis treatment thereof achieves conversion to a styrene-hydroxystyrene-divinylbenzene copolymer.

The hydrolysis by which to convert acyloxy group of the styrene-acyloxystyrene-divinylbenzene copolymer to hydroxyl group can be performed by a means and under conditions known in the field, and an acid catalyst or an alkali catalyst may be used. The method of the present invention does not require conversion of all acyloxy groups to hydroxyl groups. After the aforementioned treatments, a porous resin can be obtained. Where desired, treatments such as drying, classification and the like may be applied.

The porous resin of the present invention can be used as a carrier for a chemical reaction. The use of the porous resin of the present invention obliterates problems of, for example, changes in the pressure in a columnar reaction container having a given amount and the like, even when plural organic solvents are exchanged and used in a series of the steps of a chemical reaction, since difference in the degree of swelling of the porous resin in each organic solvent is small.

EXAMPLES

Example (Suspension Copolymerization)

A 2 L separable flask equipped with a condenser, a stirrer and a nitrogen inlet tube was set on a constant temperature water bath, polyvinyl alcohol (48 g, manufactured by Wako Pure Chemical Industries, Ltd., average degree of polymerization about 500) and distilled water (1600 g) were placed therein and stirred at 400 rpm. While respectively flowing cooling water and nitrogen gas, the stirring was continued at a constant temperature water bath temperature of 55° C. to dissolve polyvinyl alcohol. Separately, styrene (80 g, manufactured by Wako Pure Chemical Industries, Ltd.), p-acetoxystyrene (7 g, manufactured by Aldrich), divinylbenzene (7.5 g, manufactured by Wako Pure Chemical Industries, Ltd.), 2-ethylhexanol (70 g, manufactured by Wako Pure Chemical Industries, Ltd.), isooctane (30 g, manufactured by Wako Pure Chemical Industries, Ltd.), dibenzoylperoxide (1.8 g, manufactured by NOF Corporation, containing water by 25%) and n-dodecylmercaptan (0.1 g, manufactured by Wako Pure Chemical Industries, Ltd.) were added, mixed and dissolved, and this solution was placed in the above-mentioned separable flask. While stirring under a nitrogen stream at peripheral velocity of 2.0 m/s, the temperature was raised from room temperature to 80° C. to conduct suspension copolymerization for 24 hr.

(Washing)

The polymerization product was washed by filtration using distilled water and acetone (manufactured by Wako Pure Chemical Industries, Ltd.) to allow dispersion in acetone to the total amount of about 2 L. This was further dispersed using an ultrasonic homogenizer and further washed by filtration using distilled water and acetone to allow dispersion in acetone to the total amount of about 1 L.

(Classification)

This dispersion was stood still until beads-like copolymer precipitated and the precipitate was not disturbed even when the dispersion was tilted, and the supernatant (acetone) was disposed. Acetone was again added to the precipitate to the total amount of about 1 L, the mixture was stood still, and acetone was disposed, which operation was repeated 12 times to allow for classification. The dispersion was filtered and vacuum dried to give a styrene-acetoxystyrene-divinylbenzene copolymer as a powder.

(Hydrolysis)

The above-mentioned styrene-acetoxystyrene-divinylbenzene copolymer (70 g) and tetrahydrofuran (467 g, manufactured by Wako Pure Chemical Industries, Ltd.) were placed in a 1 L separable flask and the mixture was stirred at 200 rpm. While respectively flowing cooling water and nitrogen gas, the stirring was continued at a constant temperature water bath temperature of 50° C. to allow dispersion. Thereto was added hydrazine monohydrate (105 g, manufactured by Wako Pure Chemical Industries, Ltd.) and the copolymer was hydrolyzed for 15 hr. The reaction mixture was neutralized with hydrochloric acid and the polymerization product was washed by filtration using distilled water and acetone. The product was dispersed in acetone to the total amount of about 1 L, and the dispersion was filtered and vacuum dried to give a porous resin bead comprising a powdery styrene-hydroxystyrene-divinylbenzene copolymer.

Comparative Example

In the same manner as in Example except that n-dodecylmercaptan was not added to the suspension copolymerization system and the polymerization time was set to 15 hr, a porous resin bead comprising a powdery styrene-hydroxystyrene-divinylbenzene copolymer was obtained.

EXPERIMENTAL EXAMPLE

The porous resin beads obtained in Example and Comparative Example were subjected to the following analysis.
(1) average particle size: laser diffraction/scattering method (apparatus: LA-920, manufactured by HORIBA, Ltd.)
(2) specific surface area: multipoint BET method (apparatus: NOVA1200 manufactured by QuantaChrome Co.)
(3) amount of hydroxyl group: measured by titration based on JIS K0070. To be specific, the hydroxyl group of the porous resin beads (measurement object) was acetylated with a known amount of an acetylation reagent (acetic anhydride), the amount of acetic anhydride left unconsumed during acetylation was determined by titration with potassium hydroxide and the amount of the hydroxyl group of the sample was calculated. Specific method was as follows.

Acetic anhydride (25 g) and pyridine were mixed to the total amount of 100 mL and used as an acetylation reagent. A measurement sample (0.5–2 g, dry porous resin beads) was measured and placed in a flask, and the above-mentioned acetylation reagent (0.5 mL) and pyridine (4.5 mL) were precisely added. The mixture in the flask was set to 95–100° C., and after 2 hrs' lapse, allowed to cool to room temperature and distilled water (1 mL) was added. After heating for 10 min, acetic anhydride not consumed by acetylation was decomposed. The total amount of the flask was placed in a beaker, diluted with distilled water to the total amount of 150 mL and titrated with 0.5 mol/L of aqueous potassium hydroxide solution.

Separately, blank measurement was performed in the same manner as above without a measurement sample. The amount of hydroxyl group in the measurement sample can be calculated by the following formula (1), wherein A (μmol/g) is the amount of hydroxyl group in the measurement sample, B (mL) is the titration amount of the aqueous potassium hydroxide solution in the blank measurement, C (mL) is the titration amount of the aqueous potassium hydroxide solution in the measurement of the measurement sample, f is a factor of the aqueous potassium hydroxide solution, and M (g) is the weight of the measurement sample.

$$A=(B-C)\times 0.5(\text{mol}/L)\times f\times 1000\div M \quad (1)$$

The results of the above-mentioned (1)–(3) are shown in Table 1.

TABLE 1

| analysis item | Example | Comparative Example |
|---|---|---|
| (1) average particle size (μm) | 40 | 43 |
| (2) specific surface area (m²/g) | 42 | 49 |
| (3) amount of hydroxyl group (μmol/g) | 530 | 525 |

(4) degree of swelling: large excess amounts of various organic solvents (toluene, acetonitrile, pyridine, tetrahydrofuran (THF), dichloromethane, ethyl acetate and acetone) were added to porous resin beads (1.00 g), stood at room temperature for 24 hr and the apparent volume of swollen resin was determined.

Figure 1B:
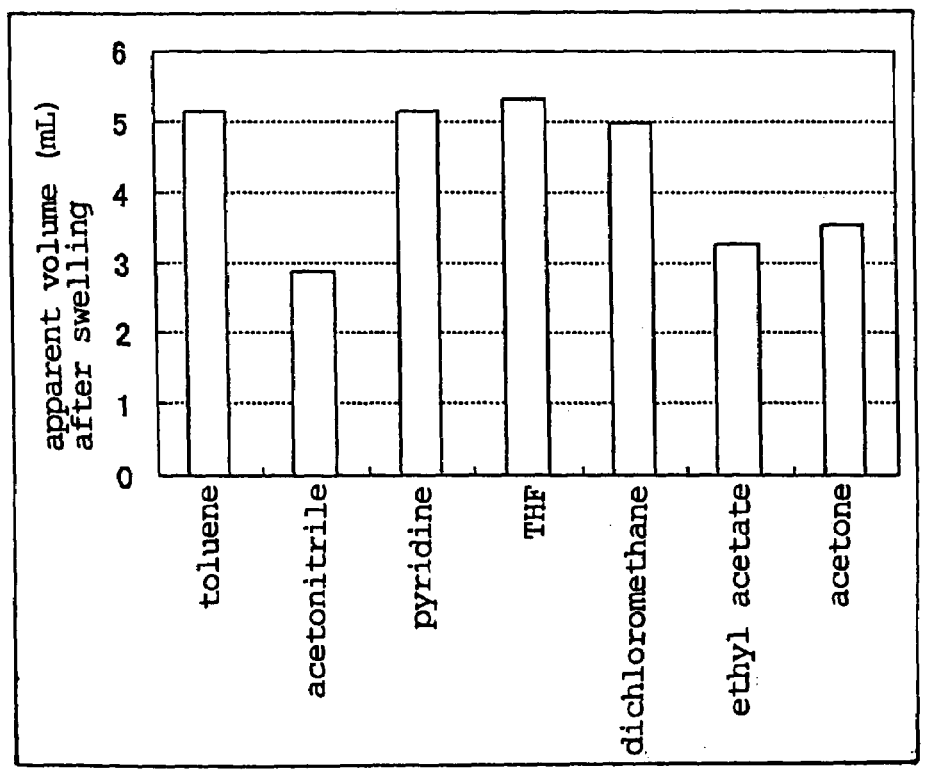
FIG. 1B is a graph showing the apparent volume (mL) of the porous resin beads of Comparative Example in various organic solvents (toluene, acetonitrile, pyridine, tetrahydrofuran (THF), dichloromethane, ethyl acetate, acetone).

The results are shown in FIG. 1A (porous resin beads of Example) and FIG. 1B (porous resin beads of Comparative Example).

As is clear from Table 1, the porous resin beads of Example and the porous resin beads of Comparative Example showed almost the same results in the average particle size, specific surface area and amount of hydroxyl group. However, from FIG. 1A and FIG. 1B showing the apparent volumes after swelling in various organic solvents, the distribution range of the apparent volume of the porous resin beads of Comparative Example was 2.9–5.3 mL, whereas that of the porous resin beads of Example was 4.1–4.9 mL. That is, the porous resin beads obtained by the production method of the present invention showed less dispersion in the degree of swelling in various organic solvents.

From the above results, it is clear that a porous resin showing smaller difference in the degrees of swelling in various organic solvents, which can provide a reaction field wherein a chemical reaction can be efficiently carried out, can be obtained according to the present invention.

This application is based on a patent application No. 2004-145596 filed in Japan, the contents of which are hereby incorporated by reference.

What is claimed is:

1. A production method of a porous resin, which comprises a step of producing a styrene-acyloxystyrene-divinylbenzene copolymer comprising suspension copolymerization of a styrene monomer, an acyloxystyrene monomer and a divinylbenzene monomer using an organic solvent and water, and a step of converting the styrene-acyloxystyrene-divinylbenzene copolymer to a styrene-hydroxystyrene-divinylbenzene copolymer, wherein a chain transfer agent is added to the suspension copolymerization system, and wherein, in the suspension copolymerization, the proportion of the amount of the acyloxystyrene monomer in the total amount of monomer is 0.2–20 wt %, and the proportion of the amount of the divinylbenzene monomer in the total amount of the monomer is 2–30 wt %.

2. The method of claim 1, wherein the weight of the organic solvent in the suspension copolymerization is 0.5–2.0 times the total weight of the monomer.

3. The method of claim 1, wherein the amount of the chain transfer agent in the suspension copolymerization is 0.01–5 wt % of the total amount of the monomer.

4. The method of claim 1, wherein the styrene monomer comprises styrene, the acyloxystyrene monomer comprises p-acetoxystyrene and the divinylbenzene monomer comprises divinylbenzene.

5. The method of claim 1, wherein the porous resin is in the form of a bead.

6. A production method of a styrene-acyloxystyrene-divinylbenzene copolymer, which comprises suspension copolymerization of a styrene monomer, an acyloxystyrene monomer and a divinylbenzene monomer using an organic solvent and water, wherein a chain transfer agent is added to the suspension copolymerization system, and wherein, in the suspension copolymerization, the proportion of the amount of the acyloxystyrene monomer in the total amount of monomer is 0.2–20 wt % and the proportion of the amount of the divinylbenzene monomer in the total amount of the monomer is 2–30 wt %.

7. The method of claim 6, wherein the weight of the organic solvent in the suspension copolymerization is 0.5–2.0 times the total weight of the monomer.

8. The method of claim 6, wherein the amount of the chain transfer agent in the suspension copolymerization is 0.01–5 wt % of the total amount of the monomer.

9. The method of claim 6, wherein the styrene monomer comprises styrene, the acyloxystyrene monomer comprises p-acetoxystyrene and the divinylbenzene monomer comprises divinylbenzene.

* * * * *

UNITED STATES PATENT AND TRADEMARK OFFICE
CERTIFICATE OF CORRECTION

PATENT NO.      : 7,115,672 B2
APPLICATION NO. : 11/128617
DATED           : October 3, 2006
INVENTOR(S)     : Mori et al.

It is certified that error appears in the above-identified patent and that said Letters Patent is hereby corrected as shown below:

Title Page and item 45

Item (*) Notice: "Subject to any disclaimer, the term of this patent is extended or adjusted under 35 U.S.C. 154(b) by 0 days" should read: --Subject to any disclaimer, the term of this patent is extended or adjusted under 35 U.S.C. 154(b) by 0 days. This patent is subject to a terminal disclaimer.--

Signed and Sealed this

Tenth Day of April, 2007

JON W. DUDAS
*Director of the United States Patent and Trademark Office*